United States Patent Office 3,432,394
Patented Mar. 11, 1969

3,432,394
FERMENTATIVE PRODUCTION OF TETRACYCLINE
Ivan Villax, Lisbon, Portugal, assignor to International Rectifier Corporation, Los Angeles, Calif., a corporation of California
No Drawing. Continuation of application Ser. No. 425,612, Jan. 14, 1965. This application Aug. 15, 1967, Ser. No. 661,497
U.S. Cl. 195—80　　　　　　　　　　　　　　1 Claim
Int. Cl. C12k 3/00

ABSTRACT OF THE DISCLOSURE

A process is disclosed for the microbiological production of tetracycline. The process comprises cultivating a *Streptomyces lusitanus* microorganism in an aqueous nutrient medium containing assimilable sources of carbon and nitrogen and chlorine ion-yielding salt and recovering tetracycline values from the fermentation broth. In the process the production of chlorotetracycline is substantially entirely suppressed and the produciton of tetracycline is enhanced.

---

This application is a continuation of application Ser. No. 425,612, filed Jan. 14, 1965, and now abandoned.

The present invention relates to a fermentation process for producing tetracycline and for the recovery of the latter from the fermentation medium.

The microbiological production, fermentatively, with the aid of *Streptomyces lusitanus*, of chlortetracycline in a medium containing chlorine ions, and of tetracycline in a medium free from chlorine ions, has heretofore been disclosed.

The present invention is concerned with the microbiological production of tetracycline, in the presence of chlorine ions in the fermentation medium and without simultaneous chlortetracycline coproduction, with the aid of a Streptomyces natural isolate or of a mutant thereof, and more especially with the aid of a preferred, so-called industrial, strain. In view of the similarity thereof to *Streptomyces lusitanus* with respect to taxonomical characteristics, the new species is called *Streptomyces lusitanus* var. *tetracyclini*. The preferred and industrially highly useful strain, *Streptomyces lusitanus* var. *tetracyclini* 106–T, has been carefully selected under ultraviolet light and a culture thereof has been deposited in the National Collection of Industrial Bacteria, Aberdeen, Scotland, with accession No. NCIB 9500.

Various microorganisms known to produce tetracycline comprise *Streptomyces aureofaciens*, *Streptomyces sayamaensis*, *Streptomyces viridfaciens*, *Streptomyces psammoticus*, *Streptomyces persimilis*, etc.; however, *Streptomyces lusitanus* var. *tetracyclini* is distinguished by producing tetracycline with such a high yield that it surpasses by far the production of any other known species.

The fact that *Streptomyces lusitanus* var. *tetracyclini* 106–T produces tetracycline in presence of chlorine is of great industrial interest, as tetracycline is actually the most important of all the teracyclines from the point of view of production and sales, and the preparation of chlorine ion containing culture media is cheaper than that of the dechlorinated media.

*Streptomyces lusitanus* var. *tetracyclini* was isolated from the soil in Brive-la-Gaillarde, France, in a place denominated "Migoul." In accordance with the criteria of the classification systems of Ettlinger et al., and Pridham et al. it has been determined to be a species independent from those cited above.

*Streptomyces lustinanus* var. *tetracyclini* 106–T produces, according to the conditions of fermentation, 9 to 12 grams of tetracycline per liter (g./l.) of fermented broth. It should be noted that in the present specification the designation "g./l." always refers to tetracycline hydrochloride in accordance with international custom.

*Streptomyces lusitanus* var. *tetracyclini* 106–T has straight to flexous, sympodially branched sporophores, forming no spirals and no verticals but only open hooks, the surface of spores being smooth when observed through an electron microscope. The form of spores is ovoid, measuring 0.6–0.8μ by 1.3–1.7μ; the color "en masse" of the spores goes from light-gray to olive buff; generally it sporulates very well, like *Streptomyces lusitanus* (CBS 101–A), on certain "rich" media.

According to Ettlinger's classification, *Streptomyces lusitanus* var. *tetracyclini* 106–T belongs to the group: straight to flexous, sympodially branched, "griseus" to "cinnamoneus," smooth spores, with melanin pigment.

According to Pridham et al.'s classification system, *Streptomyces lusitanus* var. *tetracyclini* 106–T belongs to the group: "Retinaculum Apertum," series "gray" to "olive buff."

With a view to comparing and differentiating *Streptomyces lusitanus* var. *tetracyclini* 106–T, there are hereinafter set forth the cultural characteristics of
  *Streptomyces lusitanus*, (CBS 101–A),
  *Streptomyces lusitanus* var. *tetracyclini* 106–T, NCIB 9500,
  *Streptomyces aureofaciens*, NRRL 2209,
  *Streptomyces viridifaciens*, ATCC 11989 on 14 various media after 16 days of incubation at 26° C.

(1) Corn steep liquor medium 0.6% of the composition:

| | |
|---|---:|
| Agar agar _____grams__ | 10 |
| Corn steep liquor, 50% _____do____ | 3 |
| Glucose _____do____ | 15 |
| $(NH_4)_2HPO_4$ _____do____ | 2.5 |
| $KH_2NO_4$ _____do____ | 7.5 |
| $MgSO_4 \cdot 7H_2O$ _____do____ | 1 |
| $MnCl_2$ _____do____ | 0.002 |
| $CuSO_4 \cdot 5H_2O$ _____do____ | 0.002 |
| $ZnSO_4 \cdot 7H_2O$ _____do____ | 0.025 |
| Water _____cc__ | 500 | pH 7, after sterilization.

The aerial mycelium of *Streptomyces lusitanus* is light-gray, of *Streptomyces lusitanus* var. *tetracyclini* 106–T dark-brown, of *Streptomyces aureofaciens* dark-gray, and of *Streptomyces viridifaciens* gray to almost black. *Streptomyces lusitanus* var. *tetracyclini* 106–T produces dark-brown diffusible pigment compared to that of *Streptomyces viridifaciens* which is lighter. All strains grow well.

(2) Corn steep liquor medium 0.4% having the same composition as medium (1), but the quantity of corn steep liquor being 2 grams instead of 3 grams. The four strains grow similarly to medium No. 1, although growth is slower.

(3) Gelatin medium of the composition:

| | |
|---|---:|
| Meat extract _____grams___ | 1.5 |
| Peptone _____do____ | 2.5 |
| Gelatin _____do____ | 80 |
| Distilled water _____cc___ | 500 | pH 6.2, before sterilization.

The four cultures grow similarly, no liquefaction being present. *Streptomyces aureofaciens* and *Streptomyces viridifaciens* do not produce diffusible pigment, while *Streptomyces lusitanus* produces a yellow pigment and *Streptomyces lusitanus* var. *tetracyclini* 106–T produces a yellowish-brown pigment.

(4) Czapek-Dox-Dextrine medium of the composition:

| | |
|---|---|
| Dextrine | grams__ 5 |
| NaNO₃ | do____ 1 |
| K₂HPO₄ | do____ 0.5 |
| MgSO₄.7H₂O | do____ 0.25 |
| KCl | do____ 0.25 |
| FeSO₄ | A small crystal |
| Agar agar | grams__ 7.5 |
| Distilled water | cc__ 500 | pH 6.8, after sterilization.

*Streptomyces lusitanus* and *Streptomyces lusitanus* var. *tetracyclini* 106–T do not grow on this medium, but *Streptomyces aureofaciens* and *Streptomyces viridifaciens* have a yellow colored vegetative growth, typical of these tetracycline-producing species.

(5) Potato plug: A potato plug ($\phi$ 1.5 cm., 3–6 cm. high) is washed with a 10% solution of sodium carbonate and sterilized in an assay tube together with 1.5 cc. of distilled water.

*Streptomyces aureofaciens* and *Streptomyces viridifaciens* grow well with the typical golden-yellow color characteristic of these species, compared to the bronze color of *Streptomyces lusitanus* and the dark-bronze of *Streptomyces lusitanus* var. *tetracyclini* 106–T.

(6) Bennett Agar of the composition:

| | |
|---|---|
| Yeast extract | grams__ 0.5 |
| Meat extract | do____ 0.5 |
| Hydrolyzed casein | do____ 1 |
| Glucose | do____ 5 |
| Agar agar | do____ 7.5 |
| Distilled water | cc__ 500 |

The pH, adjusted to 7, gives after sterilization pH 6.7.

The growth of the four cultures is similar to that obtained in media (1) and (2), but *Streptomyces aureofaciens* and *Streptomyces viridifaciens* do not form aerial mycelium, and the spores "en masse" of *Streptomyces lusitanus* var. *tetracyclini* 106–T are brown-colored, those of *Streptomyces lusitanus* being slightly grayish-white. *Streptomyces aureofaciens* and *Streptomyces viridifaciens* do not form diffusible pigment, while *Streptomyces lusitanus* and *Streptomyces lusitanus* var. *tetracyclini* 106–T produce a dark-brown pigment.

(7) Glycerin-asparagin medium of the composition:

| | |
|---|---|
| Glycerin | grams__ 5 |
| Asparagin | do____ 0.25 |
| Meat extract | do____ 1 |
| K₂HPO₄ | do____ 0.25 |
| Agar agar | do____ 7.5 |
| Distilled water | cc__ 500 | pH 6.9, after sterilization.

*Streptomyces lusitanus* and *Streptomyces aureofaciens* fail to produce aerial mycelium; the former presents a brown growth and pigment and the latter a slightly yellowish-white growth without formation of pigment. *Streptomyces lusitanus* var. *tetracyclini* 106–T grows well, forming a very scant light-brown aerial mycelium and a pigment of the same color as that of *Streptomyces lusitanus*. *Streptomyces viridifaciens* grows well with heavy light-gray aerial mycelium without formation of diffusible pigment.

(8) Czapek-Dox medium of the composition:

| | |
|---|---|
| NaNO₃ | gram__ 1 |
| K₂HPO₄ | do____ 0.5 |
| MgSO₄.7H₂O | do____ 0.25 |
| KCl | do____ 0.25 |
| FeSO₄ | A small crystal |
| Agar agar | grams__ 7.5 |
| Distilled water | cc__ 500 | pH 7.1, after sterilization.

*Streptomyces lusitanus* and *Streptomyces lusitanus* var. *tetracyclini* 106–T do not grow on this medium, as likewise in all media containing inorganic nitrates as sole source of nitrogen. *Streptomyces aureofaciens* and *Streptomyces viridifaciens* grow well, without any aerial mycelium, presenting the typical light-yellow color.

(9) Emerson agar of the composition:

| | |
|---|---|
| Yeast extract | grams__ 2 |
| Soluble starch | do____ 7.5 |
| K₂HPO₄ | do____ 0.5 |
| MgSO₄.7H₂O | do____ 0.25 |
| Agar agar | do____ 10 |
| Distilled water | cc__ 500 | pH 7, after sterilization.

*Streptomyces lusitanus* grows well on this medium with brown-lilac color, without aerial mycelium, and brown diffusible pigment; *Streptomyces lusitanus* var. *tetracyclini* 106–T grows similarly to the *Streptomyces lusitanus* strain but forms a light olive buff aerial mycelium. *Streptomyces aureofaciens* is characterized by faint growth, without formation of pigment; *Streptomyces viridifaciens* grows better, forming scant aerial mycelium and light-yellow diffusible pigment.

(10) Czapek-Dox-Starch medium of the composition:

| | |
|---|---|
| Soluble starch | 5 grams. |
| NaNO₃ | 1 gram. |
| K₂HPO₄ | 0.5 gram. |
| MgSO₄.7H₂O | 0.25 gram. |
| KCl | 0.25 gram. |
| FeSO₄ | A small crystal. |
| Agar agar | 7.5 grams. |
| Distilled water | 500 cc. | pH 7, after sterilization.

The results are similar to those of the other nitrate-containing media. *Streptomyces lusitanus* and *Streptomyces lusitanus* var. *tetracyclini* 106–T do not grow, while *Stroptomyces aureofaciens* and *Streptomyces viridifaciens* grow with yellow-orange color, without pigment or aerial mycelium.

(11) Litmus milk: pH 6.45 before sterilization.

All four cultures grow very slowly in a ring around the assay tube without digesting or coagulating the milk. There is a slight but apparent difference in the pH of *Streptomyces lusitanus* and that of *Streptomyces lusitanus* var. *tetracyclini* 106–T on one hand and on the other in that of *Streptomyces aureofaciens* and *Streptomyces viridifaciens*.

(12) Nutrient medium of the composition:

| | |
|---|---|
| Meat extract | grams__ 1.5 |
| Peptone | do____ 2.5 |
| Agar agar | do____ 7.5 |
| Distilled water | cc__ 500 |

The pH after sterilization is 6.8.

The four cultures are similar but *Streptomyces lusitanus* and *Streptomyces lusitanus* var. *tetracyclini* 106–T form a diffusible pigment darker than that of *Streptomyces aureofaciens* and *Streptomyces viridifaciens*.

(13) Glucose-asparagin medium of the composition:

| | |
|---|---|
| Glucose | grams__ 1 |
| Asparagin | do____ 0.25 |
| Meat extract | do____ 1 |
| K₂HPO₄ | do____ 0.25 |
| Agar agar | do____ 7.5 |
| Distilled water | cc__ 500 |

The pH after sterilization is 6.9.

*Streptomyces lusitanus*, *Streptomyces aureofaciens* and *Streptomyces viridifaciens* grow similarly with aerial mycelium, but *Streptomyces lusitanus* and *Streptomyces viridifaciens* form a dirty-yellow diffusible pigment. *Streptomyces lusitanus* var. *tetracyclini* 106–T does not form aerial mycelium; the diffusible pigment being similar to that of *Streptomyces lusitanus*.

(14) Sucrose-Dextrine-Nitrate medium of the composition:

| | |
|---|---|
| Dextrine | 5 grams. |
| NaNO$_3$ | 1 gram. |
| MgSO$_4$.7H$_2$O | 0.25 gram. |
| KCl | 0.25 gram. |
| Dextrose | 15 grams. |
| FeSO$_4$ | A small crystal. |
| Distilled water | 500 cc. | pH 7, after sterilization.

*Streptomyces lusitanus* and *Streptomyces lusitanus* var. *tetracyclini* 106–T do not grow on this medium, while *Streptomyces aureofaciens* presents a light-yellow vegetative growth, the vegetative growth of *Streptomyces viridifaciens* being dark-orange.

The utilization of carbon source by *Streptomyces lusitanus* was not possible to determine in the beginning by applying Okhi's method (OKHI, N.: Kitasato Arch. Exp. Med. 25, 209, 1953) in view of the fact that this strain does not grow in presence of inorganic nitrogen as sole source of nitrogen. The method of Pridham and Gottlieb as described by Zähner and Ettlinger in Arch. f. Mikrobiol., vol. 26, 307, 1957, was then applied. The observations were made on the tenth day. The annexed table of comparison relates solely to the six carbon sources considered by Zähner and Ettlinger as being characteristic and significant for the determination of species.

Consequently from the point of view of carbon source and according to Zähner's and Ettlinger's classification system, *Streptomyces lusitanus* var. *tetracyclini* 106–T and *Streptomyces lusitanus* 101–A belong to group IIIe and *Streptomyces aureofaciens* to group IIIa.

Accordingly, the taxonomical differentiation from the other known tetracycline-producing species has been made by comparing the original isolates as well as the industrial strains.

Consequently, as the various selections of industrial strains do not grow or grow very scantily on Ettlinger's medium of melanoid pigment formation (yeast extract 0.5 gram, L-tyrosine 0.5 gram, NaCl 4.25 grams, agar 8 grams, tap water 500 cc.), the evaluation of melanoid pigment formation was, therefore, not possible with *Streptomyces lusitanus* var. *tetracyclini* 106–T. The original isolates (mother strains of the industrial ones) of *Streptomyces lusitanus* and *Streptomyces lusitanus* var. *tetracyclini* were specially studied on this medium. *Streptomyces lusitanus* forms, within 2 days, on this tyrosine medium, a reddish pigment (consisting, with all probability, of either hallochrome or 5,6-dihydroxyindole), which slowly oxidizes into a dark pigment the color of which is not altered with the pH variation. The ultraviolet absorption curve of the extracted pigment is identical to that described by Schmidli for melanin pigment in Helvetica Chimica Acta, 38, 1078, 1955. *Streptomyces lusitanus* var. *tetracyclini* forms immediately after 3–4 days (without forming the intermediate red pigment) a black pigment similar from every point of view to "synthetic melanin" obtained by oxidation of dopa ($\beta$-(3-4-dihydroxyphenyl)-$\alpha$-alanine).

Thus both *Streptomyces lusitanus* and *Streptomyces lusitanus* var. *tetracyclini* form melanoid pigment on tyrosine media, although through two different pathways, whereas neither *Streptomyces aureofaciens* nor *Streptomyces viridfaciens* form melanoid pigment by any of those pathways.

| | Utilization of Carbon Source by— | | | | | |
|---|---|---|---|---|---|---|
| | *Streptomyces lusitanus* | | *Streptomyces aureofaciens* according to | | | *Streptomyces viridifaciens* [3] |
| Carbon source | 106–T | 101–A | Applicant's assays (strain NRRL 2209) | Zähner and Ettlinger [1] | Benedict [2] (strains: NRRL-B 1286, 1287, 1288, 2209) | |
| Rhamnose | — | — | — | — | — to (—) | + |
| Raffinose | — | — | — | — | (—) | ... |
| d-Xylose | ... | — | + | + | (+) to + | + |
| d-Fructose | (—) | — | + | + | + | + |
| l-Arabinose | (—) | (—) | + | + | + | + |
| d-Mannitol | — | — | — | +/— | (—) | + |

[1] Zähner and Ettlinger, Arch. f. Mikrobiol., 26, 307, 1957.
[2] Benedict et al., Appl. Microbiol. 3, 1, 1955.
[3] U.S. Patent No. 2,886,595.

—: No utilization.
+: Positive utilization.
...: No data available.
(—): Improbable utilization.
(+): Probable utilization.
+/—: Positive or negative utilization according to strains.

Concerning the carbon sources, unspecific from the classification point of view, all four strains show a positive utilization of glucose and dextrose. *Streptomyces lusitanus* var. *tetracyclini* 106–T and *Streptomyces lusitanus* 101–A do not grow in presence of lactose, while *Streptomyces aureofaciens* and *Streptomyces viridifaciens* grow. *Streptomyces lusitanus* var. *tetracyclini* 106–T grows heavily in presence of trehalose as carbon source, while *Streptomyces lusitanus* 101–A does not grow.

The present invention is directed to an industrially useful process, and as stated *Streptomyces lusitanus* var. *tetracyclini* 106–T is an industrial strain selected from the original isolate. Cultures of the original soil isolates of *Streptomyces lusitanus* and *Streptomyces lusitanus* var. *tetracyclini* have been preserved and are on deposit in various culture collections.

The mother strain of *Streptomyces lusitanus* var. *tetracyclini* has a tendency to form sclerotia on certain media, as for instance on Ettlinger's tyrosine-agar.

*Streptomyces lusitanus* 101–A and *Streptomyces lusitanus* var. *tetracyclini* 106–T as well as its mother strain grow at 50° C. No verticil formation was observed with either *Streptomyces lusitanus* or *Streptomyces lusitanus* var. *tetracyclini*, while in ripe cultures of both *Streptomyces aureofaciens* and *Streptomyces viridifaciens* verticils are often found.

The two mother strains differ morphologically from the industrial ones in that both belong to group "Spira."

The following table summarizes the most important taxonomical differences existing between *Streptomyces lusitanus* and *Streptomyces aureofaciens*.

| Characteristics of Differentiation | Streptomyces lusitanus | | Streptomyces aureofaciens |
|---|---|---|---|
| | Var. tetracyclini 106-T | 101-A | |
| Sporophore morphology | Sympodial branching; no verticils. | Sympodial branching; no verticils. | Monopodial branching; verticils present. |
| Color of spores "en masse" | Cinnamoneus to griseus | Cinnamoneus to griseus | Cinereus. |
| Formation of melanoid pigment on tyrosine medium. | No growth (mother strain positive). | No growth (mother strain positive). | Negative. |
| Utilization of inorganic nitrogen source | Negative | Negative | Positive. |
| Utilization of carbon source according to Zähner and Ettlinger. | Belongs to group IIIe | Belongs to group IIIe | Belongs to group IIIa. |

The above comparison shows that *Streptomyces lusitanus* var. *tetracyclini* 106–T differs only silghtly (within the range of the scientifically admitted variation of a species) from the chlortetracycline producing *Streptomyces lusitanus* (CBS 101–A) and that the differences are very accentuated and significant between *Streptomyces lusitanus* var. *tetracyclini* and *Streptomyces aureofaciens* or *Streptomyces viridifaciens*.

The simple fact that *Streptomyces lusitanus* var. *tetracyclini* 106–T produces 2 to 5 grams/liter of tetracycline more than the highest value found in the literature for a tetracycline-producing microorganism proves indirectly its independence and represents a considerable industrial improvement for the production of tetracycline.

The use of a hydrolysate of starch makes it possible to increase the amount of carbon source per liter of broth, such an increase being accompanied by a substantial increase of yield in antibiotic activity per liter of fermented broth, although both *Streptomyces lusitanus* and *Streptomyces lusitanus* var. *tetracyclini* hydrolyze starch.

The best results are obtained with a hydrolysate, containing not more than 20% of unhydrolyzed corn starch and not more than 20% of the di- and monomers, the remaining 60% consisting of oligomers. When using such a semi-hydrolysate of starch, one can add, up to 65 grams/liter, to the medium without it becoming too viscous. In comparison, the addition of 65 grams/liter of corn starch or even of considerably lesser quantities will cause a near solidification of the media, thus making a submerged fermentation unpracticable. The yields in tetracycline usually surpass 12 grams/liter under such conditions. On the other hand, this increase in carbon source makes it possible to eliminate the use of lard oil as carbon source, without a considerable loss in yield, which represents a great advantage in countries where lard oil has to be imported (as in Moslem countries). Foam control can be then achieved by using a small amount of silicon antifoam agents.

The aqueous nutritive medium for industrial fermentation by *Streptomyces lusitanus* var. *tetracyclini* 106–T contains assimilable sources of organic nitrogen, carbon and mineral salts, including chlorides, favorable to the growth of the microorganism.

As source of nitrogen, use can be made of hydrolysate of casein, extract of malt, barley or corn, corn steep liquor, peanut-meal, soya meal, etc. Inorganic nitrates are not utilizable.

As carbon source, use can be made of various carbohydrates such as glucose, dextorse, maltose, trehalose, starch, hydrolyzate of starch, dextrine, animal or vegetable fats or fatty acids.

The quantity and proportions of nutrients are exemplified in the examples.

Addition of N,N'-dibenzylethylenediamine (DBED) as acetate or lactate in a concentration of between 0.01 and 1.5 grams per liter provokes a higher yield compared to that of parallel simultaneous runs carried out without the addition of DBED. DBED is added to the broth, preferably divided into various portions, during the fermentation. The fermentation is carried out at a temperature comprised between 24° to 30° C. under stirring and strong aeration comprised between 0.1 to 4.0 parts/minute of the volume to be fermented according to the phase of fermentation.

The time of fermentation required to obtain the highest yield varies from 96 to 150 hours according to the fermentation conditions.

The fermented broth does not contain any measurable amount of chlortetracycline so selective is the tetracycline production.

An indirect proof that *Streptomyces lusitanus* var. *tetracyclini* is a species independent from *Streptomyces aureofaciens* is the fact that the color imparted to the whole harvested mash (containing no chlortetracycline) is essentially different from that described for *Streptomyces aureofaciens* in U.S. Patent No. 3,092,556. The spectrophotometric reflectance of the whole harvested mash of *Streptomcyces lustianus* var. *tetracyclini* 106–T is measured in one centimeter glass cells at wavelengths between 400 to 700 m$\mu$, using magnesium carbonate as reference. The reflectance values (R) and the corresponding wave lengths are both plotted linearly on a graph, establishing a characteristic reflectance curve. A straight line is then drawn through the linearly plotted reflectance curve intercepts at 400m$\mu$ and 550m$\mu$ and the vertical distance measured between this line and the reflectance curve at 420m$\mu$ and 430m$\mu$. The values are represented by the symbols $\Delta R_{420}$ and $\Delta R_{430}$ respectively. In the case of *Streptomyces aureofaciens*, according to U.S. Patent No. 3,092,556, $\Delta R_{420}$ is greater than $\Delta R_{430}$, and in the case of *Streptomyces lusitanus* var. *tetracyclini* 106–T $\Delta R_{420}$ is always smaller than $\Delta R_{430}$, although no demonstrable amount of chlortetracycline (<50 mcg./ml.) is present in the mash of *Streptomyces lusitanus* var. *tetracyclini* 106–T.

Once the fermentation is completed, the active principle is extracted and purified after the manner disclosed in the illustrative examples, infra.

The final product obtained in the form of hydrochloride of tetracycline has the following physical and chemical characteristics: decomposition around 214° C.; optical rotation $[\alpha]_D^{24}$ —258 (c. 0.5 in 0.1 NCHl); it is very soluble in water, methanol and ethanol. Elementary analyses of the trihydrate base correspond to the formula $C_{22}H_{24}N_2O_8 \cdot 3H_2O$, having a melting point of 170°–175° C. (dec.).

The product obtained corresponds, both in the form o fbase or as hydrochloride, in all physical, chemical and biological characteristics, to that described in the literature as tetracycline.

The industrial advantages of the present process using the natural variety of *Streptomyces lusitanus* var. *tetracyclini* 106–T consist mainly in the very high yields obtained and the cheap culture medium required.

The following non-limitative examples serve to illustrate the present invention by way of presently preferred embodiments.

EXAMPLE 1

All media were prepared with tap water. 1 liter of a sterilized medium having the following composition:

| | Grams |
|---|---|
| Corn steep liquor 50% | 10 |
| Sugar | 10 |
| $CaCO_3$ | 1 |
| $(NH_4)_2HPO_4$ | 2 |
| $KH_2PO_4$ | 2 |
| $MgSO_4 7H_2O$ | 0.25 |
| Water, ad 1000 cc. | |
| pH 6.4 after sterilization. | | was inoculated with 1 ml. (milliliter) of a suspension, in physiological saline of ripe spores of *Streptomyces lusitanus* var. *tetracyclini* 106-T and incubated at 26° C. in a flask on a rotative agitator during 36 hours.

Afterwards, a prefermenter having a working volume of 150 liters, containing a medium of the following composition:

| | Grams |
|---|---|
| Cornsteep liquor 50% | 35 |
| $CaCO_3$ | 13 |
| Sugar | 5 |

Water, ad 1000 cc.
pH 6.7 after sterilization.

was inoculated with the above mentioned 36 hour culture and fermented at 26° C. under agitation and sterile aeration for 24 hours.

Finally, a fermenter having a useful capacity of 6000 liters, containing a medium of the following composition per liter tap water:

| | Grams |
|---|---|
| Corn step liquor 50% | 28 |
| Calcium carbonate | 14 |
| Starch | 38 |
| $(NH_4)_2SO_4$ | 5.7 |
| $NH_4Cl$ | 1.5 |
| $MnSO_4.4H_2O$ | 0.05 |
| $CoCl_2.6H_2O$ | 0.002 |
| $ZnSO_4$ | 0.05 |
| Peanut meal | 25 |
| Lard oil | 35 | pH 6.7–6.8 after sterilization.

was inoculated with the above mentioned 24 hour culture and fermented at 30° C. during 24 hours with an aeration of 1.5 liters per minute per liter of broth. Then the temperature was lowered to 26° C. and the aeration slowly increased in such as way that, at the end of 140 hours, it attained 4 liters per minute per liter of broth.

After 140 hours of fermentation there are obtained 11.1 grams of tetracycline per liter, no chlortetracycline being detectable (<50 mcg./ml.).

EXAMPLE 2

The procedure is as in Example 1 but there is added to the last culture medium 0.5 gram per liter of N,N'-dibenzylethylenediamine diacetate in 4 equal portions at 0, 36, 72 and 98 hours of fermentation. After 140 hours, the quantity of tetracycline obtained is 12.3 grams per liter.

EXAMPLE 3

The fermented mash obtained in Example 1 is acidified to pH 1.5 with 25% sulphuric acid and filtered with a drum filter, the cake is then extracted twice with water at pH 1.5. To the combined filtrate there is added 18 kg. of "Versene" (ethylenediamine tetraacetate, sequestering agent) and 16.5 kg. of DBED diacetate, and afterwards the pH is slowly adjusted to 9.7 with 12% ammonia. After 3 hours of agitation, the precipitate which consists essentially of impure DBED tetracyline complex having the formula of DBED.Ca.(tetracycline)$_2$ is filtered off. The wet precipitate is then suspended in water, acidified with a 10% aqueous solution of oxalic acid to pH 1.5 under agitation. Then the solution is filtered and the pH is adjusted to 5.8 with a 10% aqueous sodium hydroxide solution. Tetracycline base precipitates. The precipitate is filtered, washed and dried under vacuum at 65° C. Effective yield 83.5% calculated in activity.

EXAMPLE 4

The procedure is as in Example 3 but instead of DBED, there is added 16 kg. of N,N'-dibenzylethylenediimine ($C_6H_5.CH=N.CH_2.CH_2.N=CH.C_6H_5$) at pH 6, effective yield in the form of base is 86% calculated in activity.

EXAMPLE 5

The procedure is as in Example 1, but the composition of the culture medium of the main fermenter is replaced by the following, per liter of tap water:

| | Grams |
|---|---|
| Corn steep liquor 50% | 31 |
| Calcium carbonate | 14 |
| Semi-hydrolyzate of starch containing not more than 20% of unhydrolyzed corn starch and not more than 20% of mono- and dimers, the remaining amount being present as oligomers | 63 |
| $(NH_4)_2SO_4$ | 5.7 |
| $NH_4Cl$ | 1.5 |
| $MnSO_4.4H_2O$ | 0.05 |
| $CoCl_2.6H_2O$ | 0.002 |
| $ZnSO_4$ | 0.05 |
| $FeSO_4$ | 0.04 |
| Peanut meal | 25 |
| Lard oil | 28 |
| Peanut oil | 4 | pH 6.7–6.8.

The final yield is 12.2 grams per liter. No chlorotetracycline is detachable in the mash (<50 mcg./cc.). From the whole harvest mash reflectance curve there are obtained from $\Delta R_{420}=18$ and $\Delta R_{430}=92.4$.

EXAMPLE 6

The procedure is as in Example 5, but the lard oil and peanut oil are omitted and foam formation is controlled by adding silicon antifoam agent. Yield after 136 hours of fermentation: 10.1 grams per liter. No chlorotetracycline is detectable in the mash.

EXAMPLE 7

40 cc. sterilized culture medium of the formula described in Example 1 for final fermentation are inoculated with germinating spores of *Streptomyces lusitanus* var. *tetracylini* 106–T in a 300 cc. Erlenmeyer flask and incubated for 7 days at 28° C. in a rotary shaker. The reflectance curve of the whole harvest mash is determined and the $\Delta R$ values calculated, giving: $\Delta R_{420}=3.8$ and $\Delta R_{430}=34.2$.

What is claimed is:

1. In a process for the production of tetracycline values by the cultivation of a *Streptomyces lusitanus* microorganism in an aqueous nutrient medium containing assimilable sources of carbon and nitrogen and chlorine ion-yielding salt, and recovering tetracycline values from the fermentation broth, the improvement according to which the microorganism is *Streptomyces lusitanus* var. *tetracyclini* 106–T (NCIB 9500) and starch hydrolyzate is used as carbon source, hydrolyzate being semi-hydrolyzate of starch containing not more than 20% of unhydrolyzed starch and not more than 20% of monomers and dimers, the remainder being oligomers, whereby the production of chlorotetracycline is substantially entirely suppressed and the production of tetracycline is enhanced.

References Cited

UNITED STATES PATENTS 3,092,556 6/1963 Growich et al.

FOREIGN PATENTS 920,126 3/1963 Great Britain.
936,314 9/1963 Great Britain.

LIONEL M. SHAPIRO, *Primary Examiner.*